D. W. GOODELL.
Oil-Stove.

No. 204,557. Patented June 4, 1878.

UNITED STATES PATENT OFFICE.

DEXTER W. GOODELL, OF NORTHAMPTON, ASSIGNOR TO THE FLORENCE MACHINE COMPANY, OF FLORENCE, MASSACHUSETTS.

IMPROVEMENT IN OIL-STOVES.

Specification forming part of Letters Patent No. 204,557, dated June 4, 1878; application filed April 5, 1878.

*To all whom it may concern:*

Be it known that I, DEXTER W. GOODELL, of Northampton, in the county of Hampshire and State of Massachusetts, have invented certain new and useful Improvements in Oil-Stoves, of which the following is a description, reference being had to the accompanying drawing, forming part of this specification.

This invention relates to removable hollow tops of oil and vapor stoves for cooking and other heating purposes, and it is more especially designed to be used in connection with that description of said stoves in which the hollow top is directly supported by the drum or body of the stove and oil-reservoir beneath.

The invention consists in a hollow top, constructed with a single pot-hole in a central position, and with lateral hollow extensions, the upper parts of which are of perforated or open-work construction, the said perforated upper walls of the hollow lateral extensions having studs or projections, as will be more fully hereinafter set forth.

Figure 1:
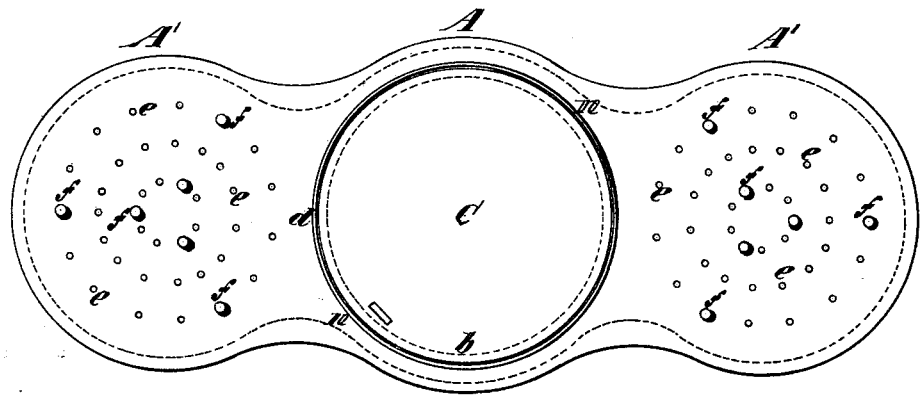
Figure 2:
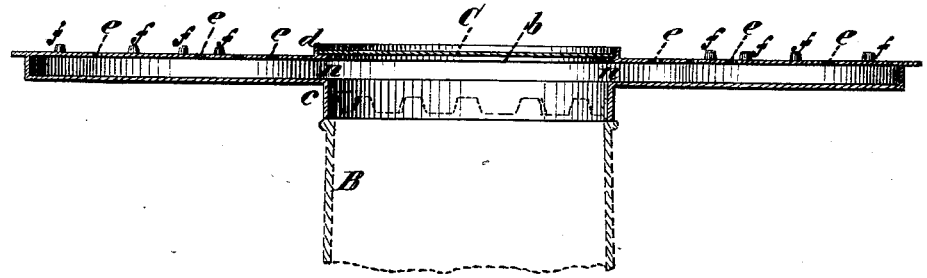

In the accompanying drawing, Figure 1 represents a top view or plan of a hollow top for oil and vapor stoves constructed in accordance with my invention, and Fig. 2 a longitudinal vertical section of the same.

A is the hollow top, which is designed to be seated on the drum B of the stove. This hollow top has a central pot-hole or cooking-opening, $b$, in it, and a depending flange, $c$, for holding the top on the drum, and is furthermore provided with a raised flange, $d$, around the central opening $b$ on the upper side of the top, for the purpose of holding or steadying utensils of various kinds arranged over or so as to project within said pot-hole. A solid or close lid, C, having only an opening for the insertion of a handle to place or remove it, is used to cover the pot-hole $b$ when the latter is not required to be uncovered or to receive a utensil within it.

The hollow top A is furthermore constructed with lateral hollow extensions A' A', having no pot-holes, but the upper parts of which are of perforated or open-work construction, being provided with any number of perforations $e$ $e$, forming outlets for the gaseous products of combustion; and said extensions A' A' are furthermore provided on their upper parts with studs or projections $f$ $f$, which are contiguous to the perforations $e$ $e$, and on which pots or other utensils may be placed for exposure to the escaping gases or products of combustion passing out through the perforations $e$ $e$. Said perforated hollow extensions A' may accordingly be used merely for the purpose of keeping up combustion and disseminating heat for general warming purposes, or for the purpose of receiving on but not in them cooking utensils to keep the contents of the latter warm, or for both purposes; but the central opening or single pot-hole $b$, which is directly over the main body of combustible gases, is the only opening applicable for ordinary cooking purposes.

I am aware that the hollow top of an oil-stove has been constructed with a central pot-hole and two lateral pot-holes, one of the latter being provided with a removable open disk, upon which cooking utensils can be placed; but such is not my invention, and is hereby disclaimed.

And I am also aware that an oil-stove has been constructed with a hollow top having four pot-holes provided with removable perforated covers having projecting studs. Such is not claimed, and moreover in such no central pot-hole is provided.

And, further, I am aware that an oil-stove has been constructed with a central pot-hole and lateral chambers perforated at their outer edges; but such have not been adapted to be supported by the drum of a stove, as in my invention. Nor have the upper walls of the lateral chambers been wholly perforated and provided with projecting studs; and the above constructions, broadly, I hereby disclaim.

I claim—

A removable top for oil-stoves adapted to be supported by the drum of a stove, constructed with a central pot-hole, $b$, and depending flange $c$, and with two chambers or hollow extensions, A' A', the upper walls of said chambered extensions being perforated and provided with studs $f$, substantially as herein shown and described.

DEXTER W. GOODELL.

Witnesses:
H. P. DIBBLE,
H. P. DIBBLE, Jr.